J. D. CURTIS.
MANURE SPREADER.
APPLICATION FILED MAR. 18, 1912.
1,087,926.
Patented Feb. 24, 1914.
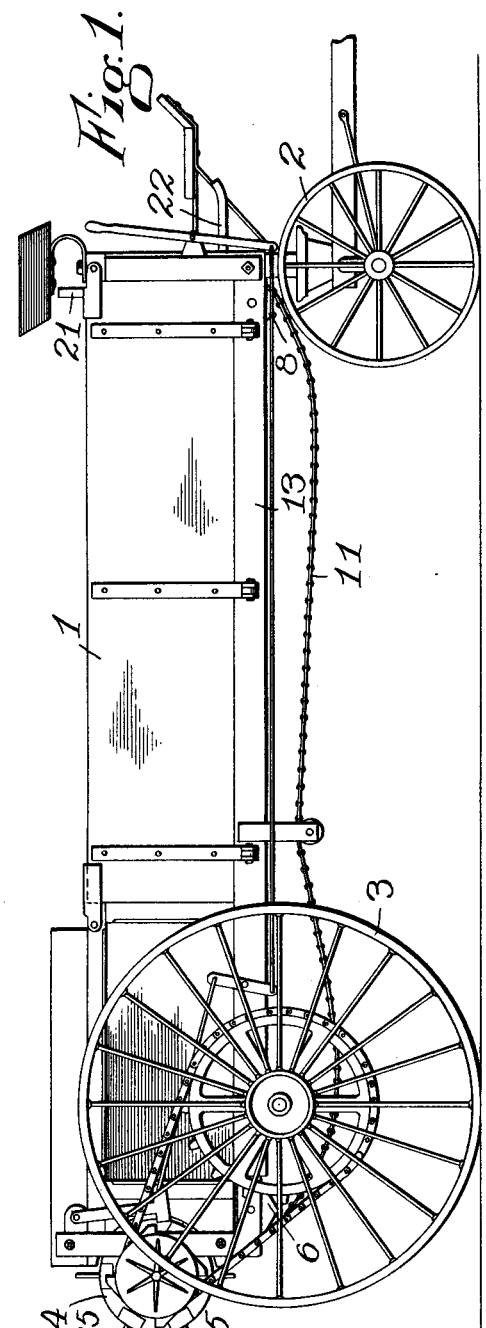
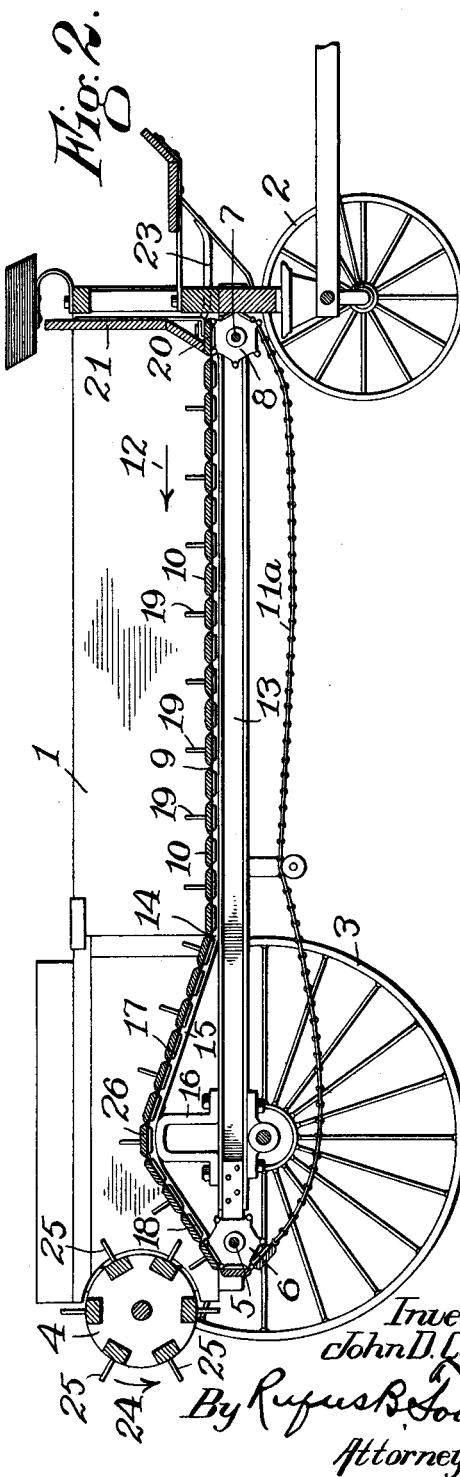

UNITED STATES PATENT OFFICE.

JOHN D. CURTIS, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

MANURE-SPREADER.

1,087,926.  Specification of Letters Patent.  Patented Feb. 24, 1914.

Application filed March 18, 1912. Serial No. 684,407.

*To all whom it may concern:*

Be it known that I, JOHN D. CURTIS, a citizen of the United States, residing at Worcester, in the county of Worcester and Commonwealth of Massachusetts, have invented a certain new and useful Improvement in Manure-Spreaders, of which the following is a specification, accompanied by drawings forming a part of the same.
My invention relates to a manure spreader having a movable bottom and a rotating beater at the rear end of the spreader, and it has for its objects to lessen the power required to operate the spreader and to increase the pulverizing of the manure as it is being distributed by the rotating beater. These objects, among others, I accomplish by the construction and arrangement of parts as hereinafter described and pointed out in the annexed claims.

Referring to the accompanying drawings, Figure 1 represents a side view of a manure spreader embodying my invention, and Fig. 2 is a longitudinal sectional view.
Similar reference characters refer to similar parts in the different figures.

The spreader embodying my invention comprises a body 1 mounted upon a pair of front wheels 2 and a pair of rear wheels 3, the latter constituting the driving wheels from which rotary motion is imparted to a rotating beater 4 at the rear end of the body and also to a sprocket wheel shaft 5 in the usual manner common in machines of this class. Upon the sprocket wheel shaft 5 are mounted sprocket wheels 6, and upon a sprocket wheel shaft 7 at the forward end of the spreader are sprocket wheels 8 which support a flexible movable bottom 9. The bottom 9 is composed of a series of slats 10, mounted at their opposite ends upon endless chains 11, 11ª which pass around the sprocket wheels 6 and 8, the slats being hinged together by the chains. Mechanism is employed for moving the flexible bottom rearwardly in the direction of the arrow 12, Fig. 2, by power derived from the rear driving wheels 3 in the usual manner in machines of this class. As this driving mechanism forms no part of my present invention and is in common use, its illustration and description are not deemed necessary.

In the operation of the machine the load of manure contained in the body 1 is supported upon the flexible bottom 9 which, in turn, is supported by sills 13 which form a horizontal track for the flexible bottom from the forward end of the body to a point 14 near the rear end of the spreader. From the point 14 strips of bar iron 15 are mounted on the sills 13 and carried over a supporting bracket 16, forming an upwardly inclined track 17 from the point 14 to the top of the bracket 16 and a downwardly inclined track 18 from the top of the bracket 16 to the sprocket wheels 6 and extending partially beneath the rotating beater 4. I preferably make the inclined track 17 longer than the inclined track 18 so as to form a gradual ascent for the load as it is carried up the track 17 and a steeper incline as it passes down the inclined track 18.

A portion of the slats 10 forming the bottom are provided with short pins or studs 19, projecting upwardly at right angles to the bottom to engage the load of manure and cause it to travel with the bottom 9. In the present instance each alternating slat 10 is provided with a series of pins extending at intervals transversely across the bottom. Upon a slat 20 at the forward end of the movable bottom I support a rigid headboard 21 which travels rearwardly with the movement of the bottom, and to opposite ends of the slat 20 I also attach curved arms 22 and 23 extending forwardly in the planes of the supporting chains 11 and 11ª. As the bottom 9 and headboard 21 are moved rearwardly, the extended arms 22 and 23 are arranged to bear upon the chains 11 and 11ª and serve as braces to aid in supporting the headboard 21 in an upright position.

In the operation of the machine, the beater is rotated rapidly in the direction of the arrow 24, while the bottom is moved with a slow movement in the direction of the arrow 12. During the rapid rotation of the beater in the direction of the arrow 24, the rear edge of the load is carried by teeth 25 in an upward direction and thrown over the top of the beater into the field. The movement of the beater teeth 25 through the rear end of the load produces a shredding action upon the manure, tearing away portions from a compact mass which is more or less interlaced with straw, hay, or fibrous material, used as bedding for horses and cattle.

In the manure spreaders now in common use, the movable bottom presents the load to the action of the beater in a horizontal plane and considerable resistance is given to the rotation of the beater which is constantly being increased as the load is being distributed, owing to the fact that the teeth of the beater tend to drive the manure forward and pack the mass more closely, so that the power required to rotate the beater is considerably increased as the forward end of the load is presented to the beater. The efficient action of the beater requires it to be revolved at a high speed, therefore the greater part of the power required in the distribution of the load of manure is expended in rotating the beater.

By my present improvement the manure is not presented to the beater in a compact mass as is usual with the common form of spreaders having horizontal bottoms, but in broken detachments which are allowed to fall loosely against the beater teeth. I accomplish this result by causing the mass of manure to be first carried up the inclined track 17 and over the apex 26, from which point the manure tumbles by gravity loosely in front of the revolving beater teeth 25. I thereby secure a greater and more uniform pulverization of the manure distributed by the beater, and I also relieve the beater from the resistance caused by forcing its teeth through the compact mass of manure. The power required to drive the beater is, therefore, very largely reduced and the packing of the load by the action of the beater teeth thereon is entirely avoided.

The rigidity of the headboard 21 as it moves rearwardly and its proper position as it advances up the inclined track 17 are secured by the support given to the arms 22 and 23 as they rest upon the chains 11 and 11ª.

I am aware that it has been proposed to employ a horizontal movable bottom having its rear end downwardly inclined for a short distance in front of the beater and I do not claim such. By my present construction, gravity acting upon the load as it is moved over the apex of the inclined track is rendered more efficient in breaking the load apart.

I claim:

1. In a manure spreader, a body, a bottom movable toward the end of the body, said movable bottom having a load supporting section, an upwardly inclined section, and a downwardly inclined section between said load supporting section and the end of the body, said downwardly inclined section having a steeper inclination than said upwardly inclined section.

2. In a manure spreader, a body, manure distributing means at the rear end of the spreader, and a bottom movable toward the distributing means, the movable bottom having an upwardly inclined section and having also a downwardly inclined section at the rear of the upwardly inclined section and extending beneath the distributing means.

3. In a manure spreader, a body, manure distributing means at the rear end of the spreader, and a bottom movable toward the distributing means, the movable bottom having an upwardly inclined section and having also a downwardly inclined section extending rearwardly beneath the distributing means from the upwardly inclined section.

4. In a manure spreader, a body, a bottom movable toward the rear end of the spreader, and manure distributing means at the rear end of the body, the movable bottom including a main load supporting section, an upwardly inclined section at the rear of the load supporting section, and a downwardly inclined section at the rear of the upwardly inclined section.

5. In a manure spreader, a body, a movable bottom having horizontal, upwardly inclined and downwardly inclined sections, the upwardly inclined section extending rearwardly from the horizontal section and the downwardly inclined section extending from the upwardly inclined section to the rear of the bottom, and manure distributing means to receive the load from the downwardly inclined section.

6. In a manure spreader, a body, manure distributing means at the rear end of the body, a movable bottom, a track for said bottom having an upwardly and a downwardly inclined section, a headboard attached to and carried by one end of said movable bottom, and means for controlling the position of said headboard as it moves over the upwardly inclined section of said track.

Dated this fourteenth day of March, 1912.

JOHN D. CURTIS.

Witnesses:
PENELOPE COMBERBACH,
NELLIE WHALEN.

Copies of this patent may be obtained for five cents each, by addressing the "Commissioner of Patents, Washington, D. C."